(12) United States Patent
Ueffing

(10) Patent No.: US 9,113,637 B2
(45) Date of Patent: Aug. 25, 2015

(54) METHOD AND DEVICE FOR OPENING A CARCASS OF A SLAUGHTERED ANIMAL

(71) Applicant: Humboldt B.V., Lichtenvoorde (NL)

(72) Inventor: Arno Hermanus Maria Ueffing, Groenlo (NL)

(73) Assignee: Humboldt B.V., Lichtenvoorde (NL)

( * ) Notice: Subject to any disclaimer, the term of this patent is extended or adjusted under 35 U.S.C. 154(b) by 0 days.

(21) Appl. No.: 14/412,727

(22) PCT Filed: Jul. 3, 2013

(86) PCT No.: PCT/NL2013/050485
§ 371 (c)(1),
(2) Date: Jan. 5, 2015

(87) PCT Pub. No.: WO2014/025250
PCT Pub. Date: Feb. 13, 2014

(65) Prior Publication Data
US 2015/0164093 A1    Jun. 18, 2015

(30) Foreign Application Priority Data
Jul. 6, 2012 (NL) ...................................... 2009151

(51) Int. Cl.
*A22C 25/16* (2006.01)
*A22B 5/00* (2006.01)
*A22C 15/00* (2006.01)

(52) U.S. Cl.
CPC ............. *A22B 5/0023* (2013.01); *A22B 5/0029* (2013.01); *A22C 15/00* (2013.01)

(58) Field of Classification Search
USPC ......... 452/149–153, 155, 156, 160, 163, 164, 452/177
See application file for complete search history.

(56) References Cited

U.S. PATENT DOCUMENTS

| | | | | |
|---|---|---|---|---|
| 5,779,533 A * | 7/1998 | Jacobs et al. | .................. | 452/160 |
| 6,050,889 A * | 4/2000 | Jacobs et al. | .................. | 452/160 |
| 6,174,229 B1 * | 1/2001 | Nielsen et al. | ................ | 452/106 |
| 7,510,468 B2 * | 3/2009 | Clifford et al. | ............... | 452/160 |
| 8,986,081 B2 * | 3/2015 | Ueffing et al. | ................ | 452/156 |
| 2005/0227601 A1 | 10/2005 | Whetstone et al. | | |

FOREIGN PATENT DOCUMENTS

| | | |
|---|---|---|
| WO | 9301725 A1 | 2/1993 |
| WO | 2007122244 A1 | 11/2007 |

* cited by examiner

*Primary Examiner* — Richard Price, Jr.
(74) *Attorney, Agent, or Firm* — The Webb Law Firm

(57) ABSTRACT

The present invention relates to a device and method for automatically processing a carcass of a slaughtered animal suspended from the hind legs. The automatically processing is driven by automatically controlled drive means for handling a slaughtering processing tool. Such slaughtering tools are a rotatable cutting blade (20) which is partially shielded and which shielding (21) is provided with a protruding guide pin (22). A further slaughtering tool is a cleaving blade (23) to split the pubic bone of the carcass. The cleaving blade is attached to the shield that partially covers the rotatable cutting blade.

16 Claims, 4 Drawing Sheets

METHOD AND DEVICE FOR OPENING A CARCASS OF A SLAUGHTERED ANIMAL

CROSS-REFERENCE TO RELATED APPLICATIONS

This application is the United States national phase of International Application No. PCT/NL2013/050485 filed Jul. 3, 2013, and claims priority to Netherlands Patent Application No. 2009151 filed Jul. 6, 2012, the disclosures of which are hereby incorporated in their entirety by reference.

BACKGROUND OF THE INVENTION

1. Field of the Invention

The invention relates to a device and a method for automatically processing a carcass of a slaughtered animal suspended from the hind legs.

2. Description of Related Art

Various solutions have been provided for automatically processing the carcasses of slaughtered animals. The carcasses are, normally in line and hanging from their hind legs, presented in its entirety to be processed to carcass halves in several steps. The automatic processing of the carcasses requires dedicated equipment for the different processing steps. These different process steps can vary in different process lines but may include among others: removing the front legs, removing the skull, splitting the pubic bone, separating the anus and the rectum from the carcass, opening the abdominal wall and sternum, removing the entrails, pizzle removing, visual inspection, and stamping. Among others a series of automatically controlled knives, braces, guides and detection means are required to process the carcasses of the slaughtered animal.

WO 93/01725 is a patent application from the same applicant as the present invention, which publication is incorporated hereby in reference. This document discloses a method and device for opening the carcass of a slaughtered animal. A cut is made in the belly wall (abdominal wall) close to the hind legs of the carcass and this cut is continued in a downward direction, whereas the intestines are kept clear of the belly wall. The cut may be continued further to also open the breast (sternum) of the carcass. The disclosed technique functions successfully in practise. Normally the equipment is embodied by an individual cutting machine that is part of a line of various processing machines that all provide a different operation on the carcasses.

A problem of the present equipment and methods of automatic processing of one or more steps in the processing of the carcasses of slaughtered animal is that it requires high volume flows of carcasses to recover the investments on the dedicated machinery required for such automation.

The present invention now has the object to provide a method and a device that enables further automation of the processing of carcasses of slaughtered animal with limited investments. Furthermore the object of the invention is to provide a method and a device that enables further flexibility in the processing of carcasses.

SUMMARY OF THE INVENTION

The present invention provides a device for automatically processing a carcass of a slaughtered animal suspended from the hind legs, comprising: automatically controlled drive means for handling a slaughtering processing tool; a rotatable cutting blade carried by the automatically controlled driving means to be displaced in substantially the plane of symmetry of the carcass for opening the abdominal wall of the carcass; and a cleaving blade carried by the automatically controlled driving means to split the pubic bone of the carcass. In a specific embodiment the device also comprises a shield partially covering the rotatable cutting blade which shield is provided with a protruding guide pin to slide behind the abdominal wall of the carcass during opening of the abdominal wall. Furthermore the cleaving blade may be attached to the shield that partially covers the rotatable cutting blade. However also a different attachment to the controlled driving means of the cleaving blade is possible as long as the controlled driving means carrying the cleaving blade are the same as the controlled driving means carrying the rotatable cutting blade. An important advantage of the device according the present invention is that both the cleaving blade and the rotatable cutting blade are handled with the same controlled driving means; this is not only a cheap solution but it also enables to combine the two operation preformed with these knives in a shorter period of process time.

The automatically controlled drive means for handling a slaughtering processing tool may for instance be a robot arm however any other manipulator can be chosen as an alternative, for instance a more traditional X, Y, Z-manipulator can be used also within the scope of the present invention. The shield may partially cover the rotatable cutting blade and may be provided to hold the intestines clear of the abdominal wall (also referred to as the belly wall). The protruding guide pin that is joined to the shield may help in combination with the shield to guide the rotatable knife relative to the carcass while cutting the abdominal wall (and also during cutting of the sternum if such cutting is taking place). The protruding guide pin can be slided behind the abdominal wall of the carcass during opening of the abdominal wall, but the guide pin may also be used to exert a pulling force to the abdominal wall during cutting with the rotatable cutting blade so to "pull" the abdominal wall outward relative to the entrails.

Normally one of the different processing steps on the carcasses of slaughtered animal that takes place before the opening of the abdominal wall and sternum of the carcasses is the cleaving of the pubic bone. Such cleaving of the pubic bone may be done manually but in high capacity slaughtering lines automatically equipment is provided that uses a cutting tool (cleaver), which is relative heavy in relation to the belly wall opener and that is embodied as a knife that is pushed through the pubic bone. The cleaving blade may be embodied as a stationary cleaving blade however also different type of cleaving blades may be used, for instance a cleaving blade that is intermittedly of otherwise moved during the cleaving operation. The knife that is used to open the abdominal wall (belly wall) and sternum (breast) of the carcass, is normally a rotatable cutting blade provided with a shielding element and a guiding guard that prevents the cutting of intestines and/or other internal body parts. The rotatable cutting blade can also be used for cleaving the pubic bone but such dual use of the rotatable cutting blade has several disadvantages. The rotatable cutting blade will be liable to wear when used for opening the (relative hard) pubic bone. The rotatable cutting blade has to be provided with teeth for cutting the pubic bone but will then be aggressive in opening the abdominal wall and sternum and the problem may arise that the cutting is not at the desired location. Also the round shape of the rotatable cutting blade is less suited for cutting the pubic bone. A large cut will be achieved if the rotatable cutting blade is used for cutting the pubic bone with an enhanced risk for damaging the entrails (intestines and bladder). Also not all the pubic bones can be split with the rotatable cutting blade as it is not always possible to determine the position of the pubic bone from the outside of the carcass. To avoid these drawbacks of cutting the pubic bone with the rotatable cutting blade use can be made of a cleaving blade. Using the cleaving blade has the advantages that cutting the pubic bone can be done more accurate and the cut can be made smaller; only there where required for reaching the pubic bone. The risk for damaging the entrails (intestines and bladder) is thus also smaller. Furthermore the cleaving blade will find "it's own way"; the cleaving blade is guided by the shape of the pubic bone. Also the rotatable cutting blade does not have to be provided with teeth thus making the rotatable cutting blade better suited for opening the abdominal wall (as well as the sternum). Finally the rotatable cutting blade will last longer; the wear of the rotatable cutting blade is limited. However the disadvantage of using a cleaving blade for opening the pubic bone is that such requires an additional automatically controlled drive means (e.g. robot arm). Now the present invention enables the effective use of the combination of a rotatable cutting blade with a cleaving blade on an efficient way as only a single automatically controlled drive means can handle both with only limited amendment of an traditional processing station for opening the abdominal wall and the sternum that makes use of a rotatable cutting blade.

In one embodiment the change of the operative and inoperative positions of the rotatable cutting blade and the cleaving blade may simply be realised by changing the position of the shield that partially covers the rotatable cutting blade relative to the rotatable cutting blade. Such change op position of the shield is possible by pivoting the shield relative to the rotatable cutting blade, for instance around the same axis as the rotatable cutting blade rotates around. As the whole device is preferably automatically controlled also the position of the shield that partially covers the rotatable cutting blade relative to the rotatable cutting blade may automatically be controlled. In some of the prior art slaughtering equipment using a rotatable cutting blade for opening the abdominal wall and the sternum use is already made of a shield (cover) from which the position is automatically controlled. Now combining the shield with the cleaving knife is constructively simple but nevertheless provides substantial additional functionality to the device according the present invention.

In a specific embodiment the device may also comprise detection means connecting to the automatic control of the drive means. Such detection means, e.g. a vision system, enables to relate the individual properties of each carcass to the automatic controlled processing of the carcasses.

A simple yet reliable construction to combine the cleaving blade and the shield that partially covers the rotatable cutting blade is to provide the shield with an additional arm that carries the cleaving blade.

To enable simple replacement of the cleaving blade it may be detachably connected to the shield partially covering the rotatable cutting blade.

The present invention also provides a method for automatically processing a carcass of a slaughtered animal comprising the steps: a) providing a carcass of a slaughtered animal; b) suspending the carcass from the hind legs; c) splitting the pubic bone of the carcass with an automatically handled cleaving knife; and d) arranging a cut in the abdominal wall close to the hind legs substantially in the plane of symmetry of the carcass with an automatically handled rotating cutting blade; and e) holding the intestines clear of the belly wall during step d), wherein at the moment that the automatically handled rotating cutting blade that is used in processing step d) is making contact with the carcass the cleaving knife that is used in processing step c) is still in contact with the same carcass. In a specific embodiment of this method the operative position of cleaving knife and the inoperative position of the rotatable cutting blade are changed to an inoperative position of the cleaving knife and an operative position of the rotatable cutting blade An important advantage of this method is that the two operations of splitting the pubic bone and cutting the abdominal wall are partially overlapping thus shortening the combined processing time of these two operations. Furthermore the advantages as described in relation to the device according the present invention are also applicable to the method according the present invention. During step d) the abdominal wall may also be tensioned (pulled outward) so to further limit the chance of damaging of the intestines with the rotatable knife or the protruding guide pin. Furthermore normally after step d) the cut in the abdominal wall will be continued to the sternum so to cut the abdominal wall and the sternum with a single action.

To make it possible to start a new production cycle it is preferred that after completion of a production cycle the inoperative position of the cleaving knife and an operative position of the rotatable cutting blade is changed back to the cleaving knife's operative position and the rotatable cutting blade's inoperative position.

In a further embodiments a simple solution for changing of the cleaving knife's position and the rotatable cutting blade's position is to change the position of a shield partially covering the rotatable cutting blade which shield part carries the cleaving knife relative to the rotatable cutting blade. Such change of the position of the shield may be realised by simply rotating the shield part relative to the rotatable cutting blade.

BRIEF DESCRIPTION OF THE DRAWINGS

The invention will be further elucidated on the basis of non-limitative exemplary embodiments shown in the following figures. Herein.

DETAILED DESCRIPTION OF THE INVENTION

Figure 1:
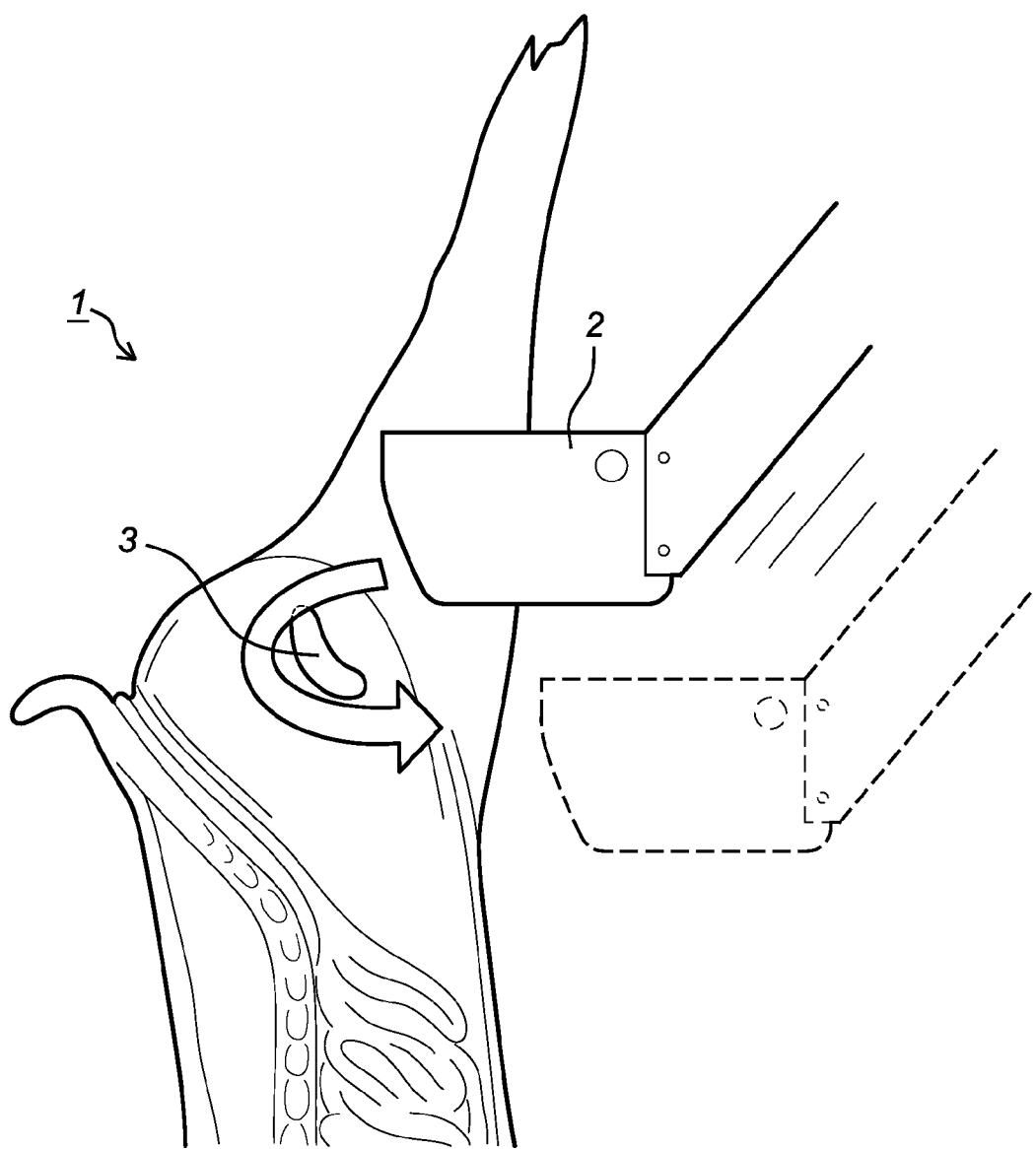
FIG. 1 shows the splitting of the pubic bone of a carcass of a pig, using a prior art cleaving knife.

FIG. 1 shows the splitting of the pubic bone of a pig carcass 1, using a prior art cleaving knife 2. Before the carcass 1 can be split in two halves one of the treatments is to split the pubic bone 3 of the carcass 1. Because the pubic bone 3 is relatively hard, a sturdy and heavy cutting cleaver 2 is generally used to perform this task. The splitting can be performed manually of automatically.

Figure 2:
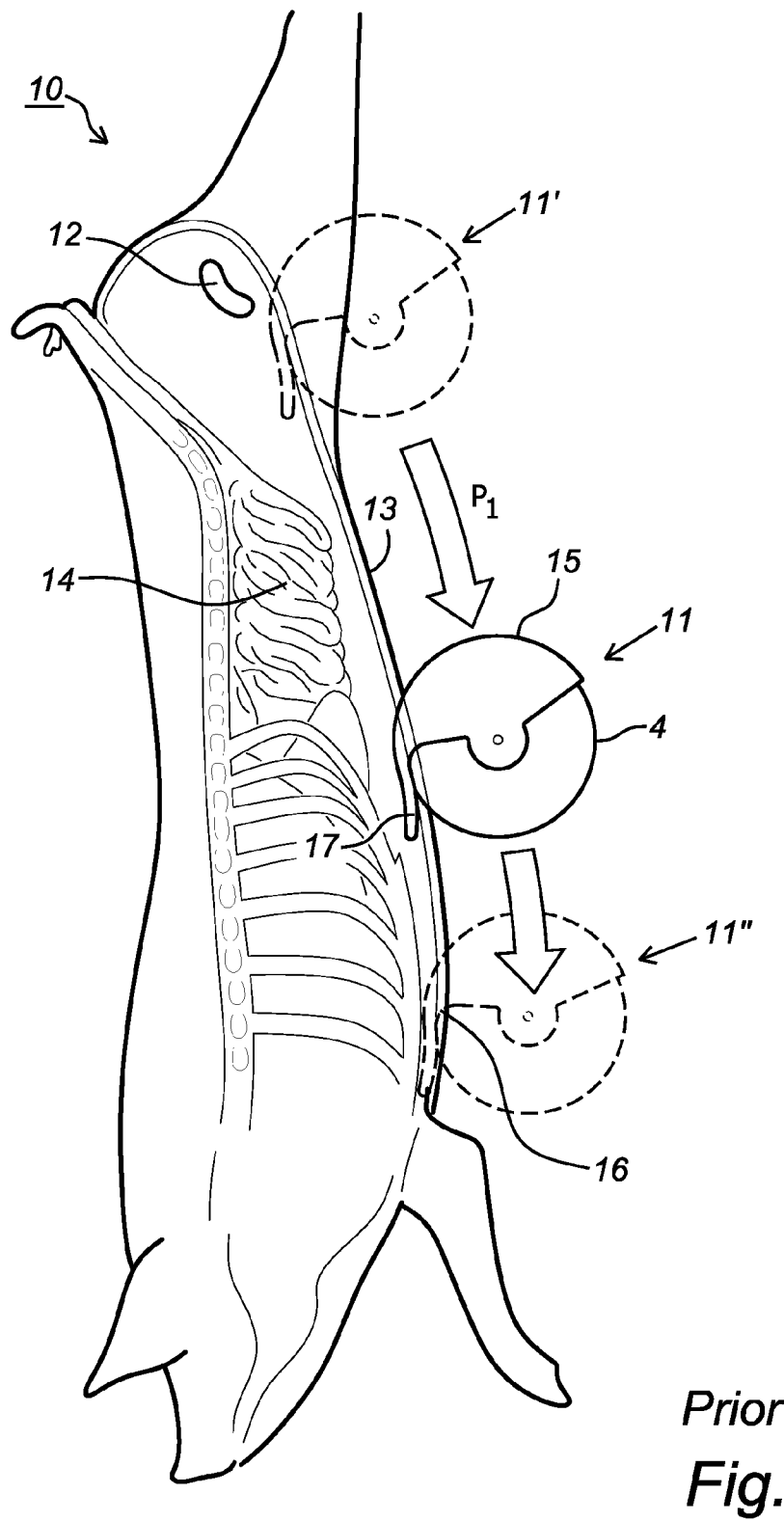
FIG. 2 shows the opening of a carcass of a slaughtered pig, using a prior art cutting blade.

FIG. 2 shows the opening of a carcass 10, using a prior art cutting blade 11. After the pubic bone 12 has been cut by a cleaving knife as shown in FIG. 1, the cutting blade 11 is used to open the belly wall 13 of the carcass 11. A finger 14 that is connected to the cutting blade 11 is pushed between the belly wall 13 and the intestines 14 of the carcass 10 to keep the intestines clear of the rotating cutting blade 11 and to guide the cutting blade while moving downward according arrow $P_1$. Furthermore a shield 15 is used to protect the intestines 14 from being opened by the rotating cutting blade 11. The start of the cutting action with the rotating cutting blade 11 is illustrated in the discontinuous represented position of the cutting blade 11'. After opening of the belly wall (abdominal wall) 13 the cutting blade can be moved further downward according arrow P₁ to also open the breast (sternum) 16; the rotating cutting blade 11 then reaching the position as is illustrated in the discontinuous represented cutting blade 11".

Figure 3:
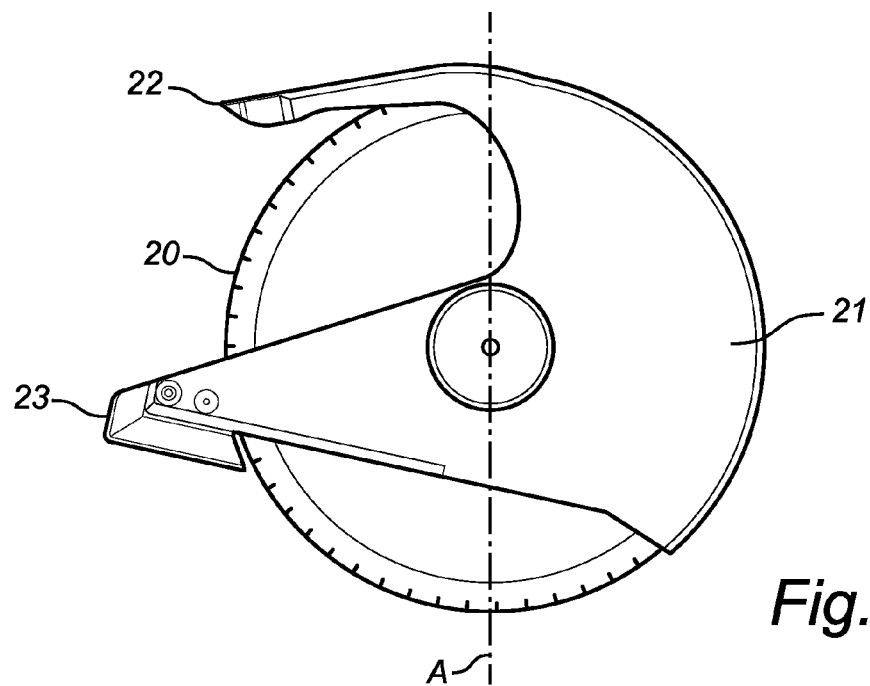
FIGS. 3 and 4 show schematic views of the present invention.

FIG. 3 shows a schematic view of a part of the device according to the present invention. A rotatable cutting blade 20 is handled by an automatically controlled drive means that are not depicted in this FIG. 3. The rotatable cutting blade 20 is to be displaced in substantially the plane of symmetry of a carcass. A shield 21 for partially covering the rotatable cutting blade 20 is provided with a protruding guide pin 22 (as referred to as a finger 22 or a spoon 22) to slide behind the abdominal wall of the carcass during the opening of the abdominal wall. Furthermore a cleaving blade 23 to split the pubic bone of carcasses is provided that is connected to the shield 21. In the shown orientation of the rotatable cutting blade 20 and the shield 21, the cleaving blade 23 is in its operative position, ready to split a pubic bone of a suspended carcass. The rotatable cutting blade 20 is here in an inoperative position. The cleaving blade 23 as shown is a stationary cleaving blade however also different type of cleaving blades 23 may be used, for instance a cleaving blade that is intermittedly of otherwise moved during the cleaving operation.

Figure 4:
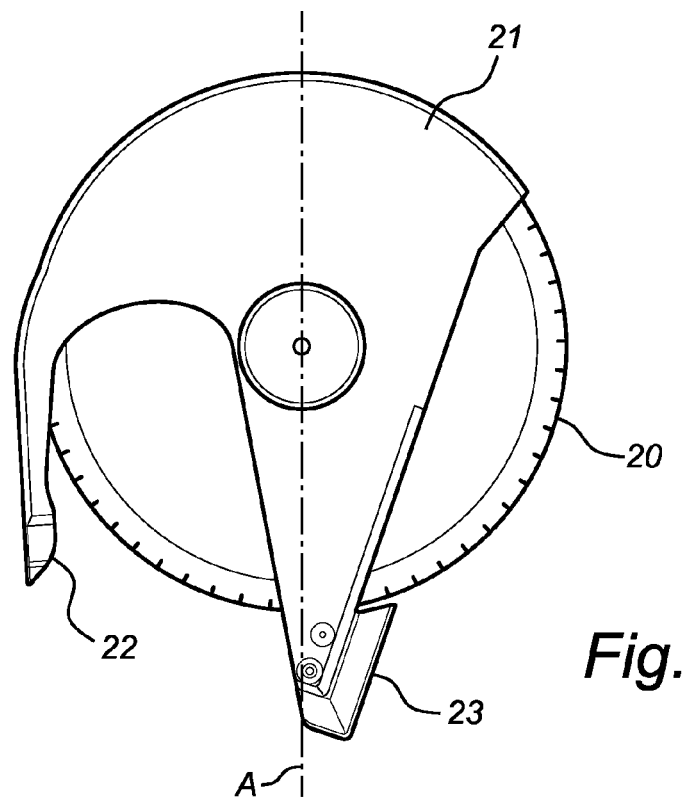

FIG. 4 also shows the rotatable cutting blade 20 that is shown in FIG. 3. The shield 21 is now compared to the illustration in FIG. 3 moved relative to the rotatable cutting blade 8 to a position wherein the guide pin 22 and the rotatable cutting blade 20 are in operative positions. The cleaving blade 23 is moved towards an inoperative position. The rotatable cutting blade 20 is now in the position to cut the belly wall of a carcass and the protruding guide pin 22 can be placed into position to slide behind the abdominal wall of the carcass to pull the belly wall clear of the intestines of the carcass, so they are prevented of being cut by the rotatable cutting blade 22.

Figure 5:
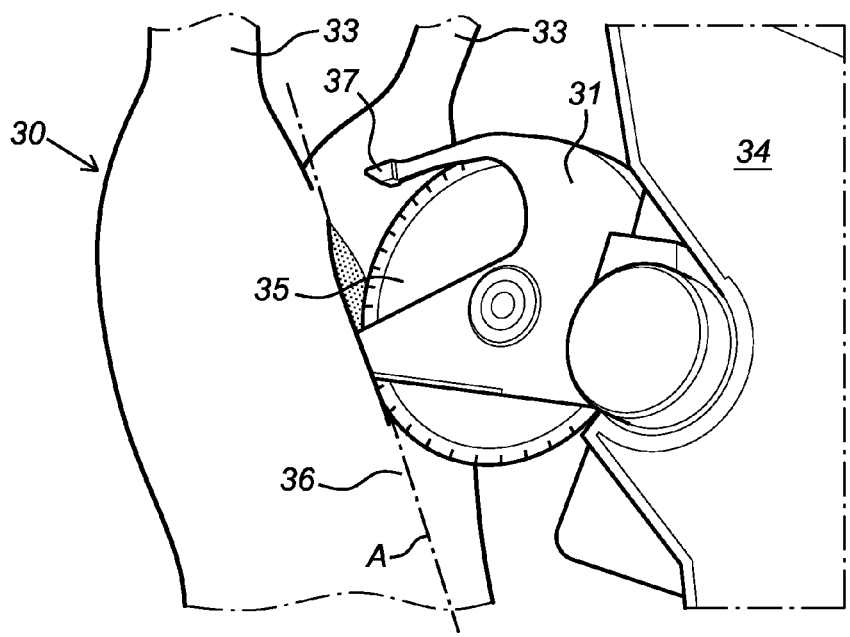
FIG. 5 shows the cleaving of the pubic bone according the present invention.
Figure 6:
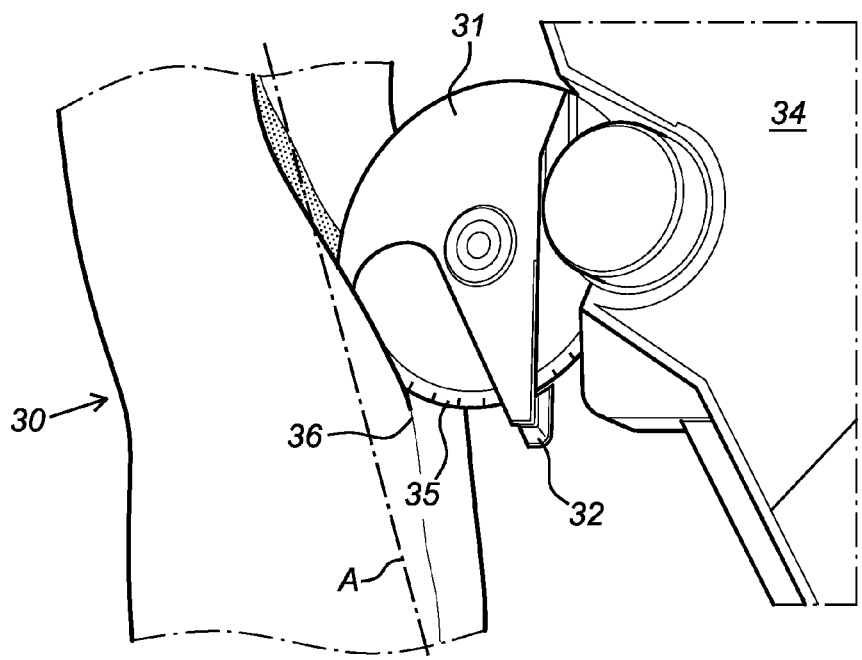
FIG. 6 shows the opening of a carcass of a slaughtered animal according the present invention.

FIG. 5 shows the cleaving of a—non visible—pubic bone of a carcass 30 of a slaughtered animal according to the present invention. A shield 31 is in an orientation wherein a—here not shown but in FIG. 6 shown—cleaving blade 32 is in its operative position, this position of the shield 31 and the cleaving blade 32 is in line with the illustration as depicted in FIG. 3. The carcass 30 is suspended from its hind legs 33. Also visible is a part of the automatically controlled drive means 34, carrying a rotatable cutting blade 35 to be displaced in substantially the plane of symmetry (A) of the carcass 30 for opening the abdominal wall 36 of the carcass 30. The shield 31 partially covers the rotatable cutting blade 35 and is provided with a protruding pin 37 that in another position of the shield 31 is able to slide behind the abdominal wall 36 of the carcass 30 while opening of the abdominal wall 36. The cleaving blade 32 is carried by the automatically controlled driving means 34.

FIG. 6 shows the same carcass 30 as shown in FIG. 5, where the orientation of the shield 31 has changed to put the cleaving blade 32 into an inoperative position away from the carcass 30. The rotatable cutting blade 35 is here depicted in its operative position active in cutting the belly wall 36 of the suspended carcass 30. Here the—now non visible—protruding guide pin 37 is placed into a contact position with the carcass 30 wherein it slides behind the abdominal wall 36 of the carcass 30. Besides protecting the intestines from being cut by the rotatable cutting blade 35 the protruding guide pin 37 may also be used to pull the abdominal wall 36 so to facilitate an even better cutting of the abdominal wall 36.

The invention claimed is:

1. A device for automatically processing a carcass of a slaughtered animal suspended from the hind legs, comprising:
   automatically controlled drive means for handling a slaughtering processing tool;
   a rotatable cutting blade carried by the automatically controlled driving means to be displaced in substantially the plane of symmetry of the carcass for opening the abdominal wall of the carcass; and
   a cleaving blade carried by the automatically controlled driving means to split the pubic bone of the carcass.

2. The device as claimed in claim 1, wherein the device also comprises a shield partially covering the rotatable cutting blade which shield is provided with a protruding guide pin to slide behind the abdominal wall of the carcass during opening of the abdominal wall.

3. The device as claimed in claim 2, wherein the cleaving blade is attached to the shield that partially covers the rotatable cutting blade.

4. The device as claimed in claim 2, wherein the position of the shield that partially covers the rotatable cutting blade is changeable relative to the rotatable cutting blade.

5. The device as claimed in claim 2, wherein the shield that partially covers the rotatable cutting blade is pivotable relative to the rotatable cutting blade.

6. The device as claimed in claim 5, wherein the shield that partially covers the rotatable cutting blade and the rotatable cutting blade are rotatable around a single axis.

7. The device as claimed in claim 2, wherein the position of the shield that partially covers the rotatable cutting blade relative to the rotatable cutting blade is automatically controlled.

8. The device as claimed in claim 1, wherein the device also comprises detection means connecting to the automatic control of the drive means.

9. The device as claimed in claim 2, wherein the shield partially covering the rotatable cutting blade is provided with an additional arm that carries the cleaving blade.

10. The device as claimed in claim 2, wherein the cleaving blade is detachably connected to the shield partially covering the rotatable cutting blade.

11. A method for automatically processing a carcass of a slaughtered animal comprising the steps:
   a) providing a carcass of a slaughtered animal;
   b) suspending the carcass from the hind legs;
   c) splitting the pubic bone of the carcass with an automatically handled cleaving knife; and
   d) arranging a cut in the abdominal wall close to the hind legs substantially in the plane of symmetry of the carcass with an automatically handled rotating cutting blade; and
   e) holding the intestines clear of the belly wall during step d),
   wherein at the moment that the automatically handled rotating cutting blade that is used in processing step d) is making contact with the carcass the cleaving knife that is used in processing step c) is still in contact with the same carcass.

12. The method as claimed in claim 11, wherein the operative position of cleaving knife and the inoperative position of the rotatable cutting blade are changed to an inoperative position of the cleaving knife and an operative position of the rotatable cutting blade.

13. The method as claimed in claim 11, wherein the after step e) the cut in the abdominal wall is continued to the sternum.

14. The method as claimed in claim 11, wherein after completion of a production cycle the inoperative position of the cleaving knife and an operative position of the rotatable cutting blade is changed back to the operative position of the cleaving knife and the inoperative position of the rotatable cutting blade.

15. The method as claimed in claim 11, wherein the changing of the position of the cleaving knife and the position of the rotatable cutting blade takes place by changing the position of a shield partially covering the rotatable cutting blade which shield part carries the cleaving knife relative to the rotatable cutting blade.

16. The method as claimed in claim 15, wherein the position of a shield partially covering the rotatable cutting blade is changed by rotating the shield part relative to the rotatable cutting blade.

* * * * *